MULTIPLE FLOW-PATTERN VALVE

INVENTORS.
Philip D. McCord
BY Ellis P. Lang, Jr.
Wood, Herron and Evans
ATTORNEYS.

MULTIPLE FLOW-PATTERN VALVE

Filed April 12, 1967 4 Sheets-Sheet 2

INVENTORS.
Philip D. McCord
BY Ellis P. Lang, Jr.
Wood, Herron & Evans
ATTORNEYS.

March 10, 1970 P. D. McCORD ET AL 3,499,467

MULTIPLE FLOW-PATTERN VALVE

Filed April 12, 1967 4 Sheets-Sheet 3

INVENTORS.
Philip D. McCord
BY Ellis P. Lang, Jr.
Wood, Herron & Evans
ATTORNEYS

MULTIPLE FLOW-PATTERN VALVE

Filed April 12, 1967 4 Sheets-Sheet 4

INVENTORS.
Philip D. McCord
Ellis P. Lang, Jr.
BY
Wood, Herron & Evans
ATTORNEYS.

United States Patent Office 3,499,467
Patented Mar. 10, 1970

3,499,467

MULTIPLE FLOW-PATTERN VALVE

Philip D. McCord, Cincinnati, Ohio, and Ellis P. Lang, Jr., Highland Heights, Ky., assignors to The Lunkenheimer Company, Cincinnati, Ohio, a corporation of Delaware Filed Apr. 12, 1967, Ser. No. 630,289
Int. Cl. F16k *11/08*
U.S. Cl. 137—625.19 8 Claims

ABSTRACT OF THE DISCLOSURE

Multiple flow pattern valve including a valve body which has at least four circumferentially arranged ports connecting with a bore, and a rotatable plug positioned within the bore and including a first peripheral slot dimensioned and positioned such that in at least one valve position it communicates with at least two adjacent ports and having a second slot dimensioned and positioned such that in at least one valve position it communicates with at least three adjacent ports. The slots are position with respect to each other such that one of the spaces between the slots, in at least one valve position, blocks at least one of the ports.

Figures 1, 2:
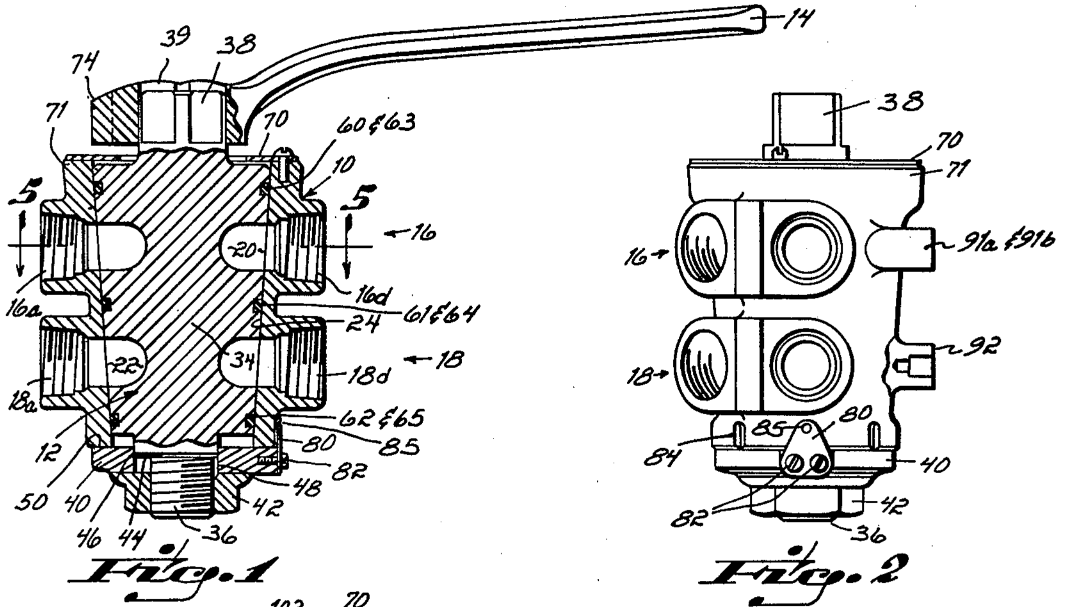

This invention relates to valves, and more particularly to multi-port valves in which the valve ports may be selectively interconnected in a variety of different combinations of two or more, to thereby provide a multiplicity of fluid flow patterns.

In order that the features and advantages of this invention are more readily appreciated and understood, the invention is described with reference to a particular application in which it possesses a substantially high degree of utility. More specfically, the invention is described with reference to its use in conjunction with fuel supply systems for boats, such as cabin cruisers and the like, which are equipped without at least two engines. However, it should be understood that the invention is not limited to use only in such marine fuel supply systems, but rather can be advantageously employed in a variety of applications where a multiplicity of flow patterns are desired.

On boats large enough to utilize two or more engines, the fuel supply system usually includes at least two fuel tanks, one of the tanks being located on the port side and the other on the starboard side. Under normal operating conditions, each of the tanks is connected to a different one of the two engines. More specifically, the tank located on the port side of the craft is connected to the port engine for supplying fuel to that engine. Likewise, the starboard tank is connected to the starboard engine for supplying fuel to the starboard engine. During the normal course of a trip, the engines are operating substantially in parallel, each one at any given time supplying approximately 50% of the boat's power requirements. Under such normal operating conditions, assuming the motors are of substantially the same horsepower, the amount of fuel consumed by each engine is substantially the same. Consequently, the contents of the respective tanks, at any one time, are substantially equal. With both tanks having approximately equal contents, the weight of the remaining fuel on board is evenly distributed, 50% of it being on the starboard side of the boat's center line and 50% of it being on the port side of the craft's center line. As a result, the boat is continuously maintained in a state of trim notwithstanding that the supply of fuel in each tank is constantly being depleted in accordance with the demands of separate and independently operated engines.

It is not unusual, however, in the course of a trip to encounter some operational difficulty which necessitates that one of the engines be operated at an output level substantially less than that of the other engine or, in some instances, completely taken out of use. When such an emergency arises requiring that the operating levels of the engines be disparate, the contents of the port and startboard tanks in due time becomes unequal. This inequality, depending on the extent thereof, introduces varying degrees of imbalance in the overall weight distribution scheme of the craft which, in extreme conditions, if left uncorrected, can cause the craft to develop a substantial list.

In addition to causing the trim of the boat to be destroyed when operational difficulties require that one of the engines be operated at a substantially reduced output or turned off entirely, another problem arises. Specifically, it will be appreciated that if each engine is connected only to its own fuel supply tank when one of the engines is rendered substantially or completely inoperative, forcing the operator to power the craft with the remaining engine, the useful fuel on board is effectively reduced by 50%, decreasing by one-half the distance that can be travelled without refueling. This can, of course, be very dangerous particularly on extended length trips.

To permit the trim of the boat to be maintained as well as to prevent a reduction in the maximum distance a boat can travel without refueling, both of which can result from an inoperative engine, it has been proposed to include in the fuel supply system a series of valves for allowing the selective interconnection of each of the engines with each of the tanks. Thus, should one of the engines, for example, the port engine, be rendered substantially or completely inoperative, the fuel pump of the starboard engine may draw fuel from both the port and starboard tanks. This permits the contents of each tank to be maintained at a substantially constant level thereby preventing a list from developing. In addition, the ability to feed a single engine from both tanks enables the entire remaining fuel supply on board to be utilized by the operative engine, thereby preventing the maximum distance that can be travelled without refueling from being materially decreased should an engine become inoperative in the course of a trip.

This type of system has also been found useful when one of the tanks develops a leak and it becomes desirable to connect both of the engines to a single tank. This is in contrast to connecting both tanks to a single engine as is the case if one engine becomes inoperative. In practice, should one of the tanks develop a leak, and it be desired to maintain the boat's speed, it becomes necessary to operate the engine whose tank does not have a leak at twice its normal rate in order to compensate for loss of the engine having the leaking tank. However, operation of a single engine at twice its normal rate is relatively inefficient from a fuel consumption standpoint in contrast to operating two engines each at their normal rate. To permit the operation of both engines at their normal rates and hereby maintain the speed of the craft without an increase in fuel consumption, it becomes necessary to connect both engines to a single tank. Thus, valve means which permit the selective interconnection of tanks and engines are useful under certain conditions for conserving fuel, as well as for preventing listing and the foreshortening of maximum travel distances.

The principal objective of this present invention is to provide a single valve which is effective to provide any of a number of flow patterns through a large number of lines interconnecting fuel tanks, engines, and the like. In order that such a valve be of maximum utility in an installation such as a fuel system of the type described, it must satisfy a number of criteria. For example, in a typical marine installation, the valve must be effective to provide six different flow patterns between two tanks and two engines involving two engine fuel supply lines and two engine fuel return lines.

Another desideratum of a valve suitable for use in marine fuel supply systems of the type described is that the valve be compact, but without a sacrifice in flow capacity. In the marine field, the engines as well as the fuel supply system are located below the floor boards of the boat where space is at a very great premium. Consequently, any valving means used for selectively interconnecting the engines and tanks must necessarily be small and compact since it has to fit in a limited space.

A third requirement of a valve for use in marine fuel supply systems is that it be relatively quick acting. Many of the boats utilizing dual engines are not of a size large enough to warrant a crew and, consequently, under normal conditions only one person is generally on board who is qualified to operate the craft. Consequently, should an emergency arise requiring the tank-engine fuel supply arrangement to be altered, it is essential that the operator, who may in fact be the only person on board, be able to single-handedly make the necessary adjustments in the valving system while still carrying out the normal duties incident to operation of the craft. Thus, it is essential that the valve be quick-acting so as not to take the boat operator away from his normal duties for an undue amount of time.

A fourth and rather universal criterion in the design of valves for the application described, as well as in all applications involving all types of valves, is that the valve be produced at minimum cost, yet without compromising reliability, capacity or ease of use. This requirement of minimum cost comprehends both low manufacturing cost as well as low valve installation cost. It is just as essential from the overall cost standpoint that a valve be installed without undue expense as be manufactured without undue initial cost. A valve which can be manufactured for 50% of the cost of other valves, but which requires twice as much labor to install may in the long run cost more by the time it is installed than the valve which costs more to manufacture. Thus, both minimum manufacturing cost and minimum installation cost are essential.

It has been an objective of this invention, therefore, to provide a valve which affords a plurality of flow patterns and which, in addition, is quick-acting, compact and inexpensive. In accordance with the principles of this invention this objective has been accomplished by employing a fundamentally different and unobvious concept in valve design which contemplates the provision, in a multiport valve body, of a plug having a pair of uniquely configured slots which bear a predetermined and unobvious relationship to the valve ports.

More specifically, this invention contemplates a valve which includes at least four ports arranged around the circumference of the valve body and communicating with the bore. The ports cooperate with a first plug slot dimensioned and positioned such that in at least one valve position it communicates simultaneously with at least two adjacent ports, and with a second plug slot dimensioned and positioned such that in at least one valve position it communicates simultaneously with at least three adjacent ports, the slots being positioned with respect to each other such that one of the spaces between the slots is dimensioned such that in at least one valve position it blocks at least one of the ports. In operation, relative rotational movement between the valve body and slotted plug, which can be produced by pivoting a valve actuating arm connected to the plug, is effective to connect different combinations of ports and slots to thereby provide a multiplicity of flow patterns.

An advantage of a valve of the type contemplated by this invention is that the flow of fluid through the valve is characterized by the absence of a substantial degree of turbulence. This result is produced as a consequence of the fact that the configuration of slots formed on the plug periphery do not include any acute angles. Consequently, the flow patterns are without rapid changes in direction which are responsible for turbulent flow conditions. A further advantage of the valve of this invention is that since its operation involves the rotational movement of a plug relative to a valve body, the valve is particularly adaptable to actuation by alternates means, such as, electric or pneumatic actuators.

A further operating characteristic of marine systems of the type described, particularly those using diesel engines, resides in the fact that the rate at which fuel is pumped from the tanks to the engines is substantially in excess of the amount of fuel actually injected into the cylinder and burned by the engines. Specifically, in the design of fuel systems for dual diesel engines, it is generally the practice to pump to the engine several times the amount of fuel actually injected into the galleys of the cylinders and ultimately consumed. The unburned fuel, which amounts to the major portion, for example, 80% of the fuel pumped, is returned to the tanks where it is subsequently recirculated through the engines where a small percentage is drawn off for consumption. A further requirement, therefore, of a valve suitable for use in fuel systems of the general type described, in which more fuel is actually pumped than utilized, is that it provide return flow paths from the engines to the tanks, as well as intake feed paths from the tanks to the engines.

It has been, therefore, an additional and equally important objective of this invention to provide a valve which is operative to interconnect each of the engines with both the tank feed lines and the tank return lines. In accordance with the principles of this invention, this objective has been accomplished by providing a second set of at least four ports and a second set of slots in the body and plug, respectively, which are axially displaced from the first set of ports and slots. In operation, the first set of ports are connectable in use between the tank feed lines and the intakes of the engines, while the second set of ports are connectable in use betwen the tank return lines and the engine fuel exhaust lines.

An advantage of a valve having this unique structure is that by manipulating a single lever connected to the valve plug, the opening and closing of the tank feed and return lines are coordinated. Thus, when the valve is operated to connect, for example, the feed lines of the port tank to both engines, the return line of the port tank is simultaneously connected to the fuel exhaust lines of both engines. Likewise, as the feed lines of both tanks are connected to a single engine, the return lines of both tanks are automatically connected to the fuel exhaust lines of the same engine. Hence, by the mere manipulation of one valve plug, both the return and feed lines are operated in a coordinated fashion.

It has been another objective of this invention to provide a valve which, in addition to permitting a multiplicity of flow patterns between a series of supply tanks and utilization devices such as marine engines, is also effective in one of its operating positions to positively prevent the existence of flow paths between any of the ports. In accordance with the principles of the invention this objective has been achieved by dimensioning the longest plug slot of the pair such that when the plug is in at least one of its positions with the longest slot fully encompassing one of the most widely spaced ports, the longest slot does not also communicate with the other of the most widely spaced ports.

A very important advantage of valves constructed in accordance with the principles of this invention is that by varying the position of the ports and/or the number of ports which cooperate with the set of slots, it is possible to increase as well as alter the flow patterns which result. For example, by providing a fifth port positioned intermediate spaced pairs of ports, it is possible to increase the number of flow patterns from six to eight without increasing the physical size of the valve.

Figure 3:
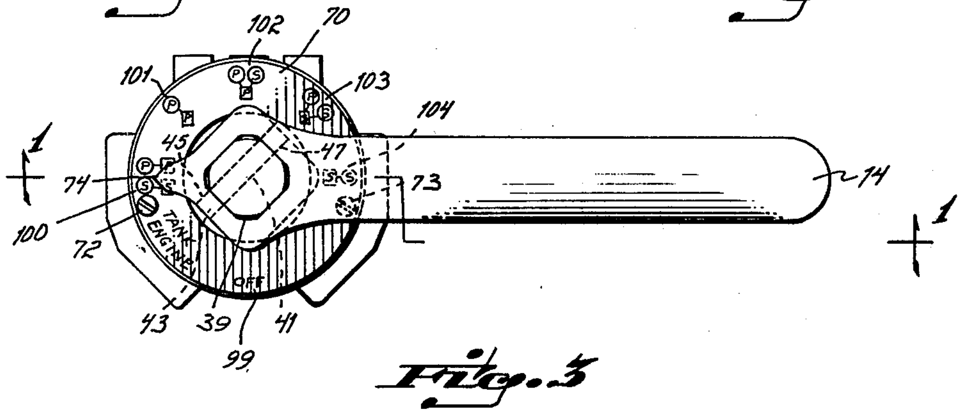
Figure 4:
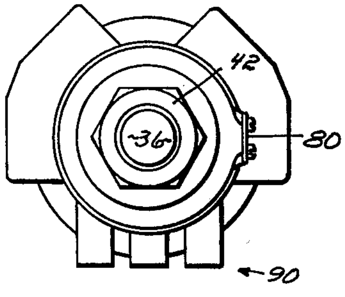

Other objectives and advantages of this invention will be more readily apparent from a detailed description of the invention taken in conjunction with the accompanying drawings in which:

FIGURE 1 depicts a front view in cross-section taken along lines 1—1 of FIGURE 3 showing one preferred embodiment of the valve of this invention having two sets of ports and slots, FIGURE 2 depicts a side view of the valve of FIGURE 1, FIGURE 3 is a plan view of the valve of FIGURES 1 and 2, FIGURE 4 is a bottom view of the valve of FIGURES 1–3, FIGURE 5 is a plan view in cross-section of the valve of FIGURES 1–4 taken along line 5—5 of FIGURE 1, FIGURES 6–11 are plan views in cross-section of the valve of FIGURES 1–5, showing six possible orientations which one of its sets of slots may assume relative to its cooperating set of spaced pairs of ports, FIGURES 12–19 are plan views in cross-section of a second embodiment of the valve of this invention, showing eight possible orientations its set of slots may assume relative to its cooperating set of four adjacent ports, FIGURES 20–27 are plan views in cross-section of a third embodiment of a valve constructed in accordance with the principles of this invention, showing eight possible orientations which its set of slots may assume relative to its five port set of adjacent ports.

As shown in FIGURE 1, one preferred embodiment of a valve constructed in accordance with the principles of this invention includes a valve body 10 adapted to receive a valve plug 12. The plug is movable relative to the body 10 by a valve actuating arm or lever 14 for producing different orientations between a first and a second set of body ports 16 and 18 and a first and a second set of plug slots 20 and 22, respectively, thereby providing a multiplicity of interconnecting port flow paths. The port sets 16 and 18 and slot sets 20 and 22 are constructed in accordance with predetermined required and optional design criteria described in detail hereinafter.

The valve body 10, more specifically, includes a centrally disposed axial bore 24 which extends the entire length of the plug. The bore 24 is preferably tapered to permit a tight fit between the plug periphery and the internal bore surface. The tapered bore 24 is produced using conventional machining techniques which are well-known to those skilled in the art and, hence, not necessary to describe in detail herein.

The valve body 10 further includes four radial ports **16*a*–16*d* comprising the first set of ports 16. Each of the ports, 16*a*–16*d* preferably lie in the same plane, which is substantially perpendicular to the axis of the bore 24 and plug 12, and communicate with the bore 24**. The ports, while preferably internally threaded to allow interconnection with threaded pipe, may be left unthreaded if soldered or brazed connections are desired.

Figure 5:
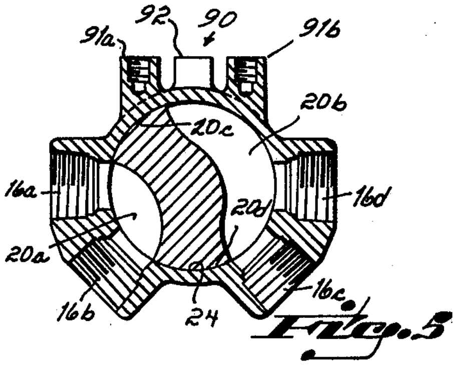

The ports **16*a*–16*d* may be spaced circumferentially in any desired manner in accordance with the flow pattern needs of the user. In the embodiment depicted in FIGURES 1–11, the ports 16*a*–16*d* are arranged in spaced pairs as best shown in FIGURE 5. Specifically, ports 16*a* and 16*d* are diametrically opposed from each other, while the ports 16*b* and 16*c* are adjacent port 16*a* and 16*d*, respectively, and spaced from each other a circumferential distance substantially equivalent to that of one of the ports 16*a*–16*d***.

The ports **18*a*–18*d* of the second port set 18 are axially spaced from the first set of ports 16 and, like the port 16*a*–16*d*, lie in substantially the same plane which is approximately perpendicular to the axis of the bore 24 and plug 12. The lower ports 18*a*–18*d* underlie the upper ports 16*a*–16*d*, respectively. Such a relationship between the individual ports 16*a*–16*d* of the upper set and the ports 18*a*–18*d*** of the lower set need not necessarily exist, but can be varied in accordance with the application in which the valve is to be used.

In the preferred embodiment depicted in FIGURES 1–11, wherein the ports of the first set 16 overlie those of the second set 18, the valve is particularly suitable for use in marine fuel systems of the type previously described. More specifically, the first set of ports 16 is adapted for connecting each of the two fuel feed lines of the tanks to the intake lines of each of the two engines, while the ports of the second set 18 are adapted for connecting the return lines of each of the tanks with the fuel exhaust lines of each of the engines. Thus, manipulation of the valve operating lever 14, thereby orienting the plug 12 rotationally relative to the body 10, is operative to simultaneously coordinate the connection of the fuel feed lines and the fuel return lines of both tanks. For example, by manipulating a single lever 14 to a position wherein the port tank is connected to the fuel intake lines of both engines, the fuel exhaust lines of both engines are automatically connected to the return line of the port tank thereby fully connecting both the intake and exhaust lines of both engines to the selected tank.

In accordance with the principles of this invention, it is essential that there be at least four ports in any given port set if the objective of obtaining a multiplicity of flow patterns is to be obtained. This requirement, or port design criterion, of at least four ports per set is satisfied in the design of both the port set 16 and the port set 18, as evidenced by the existence of four ports **16*a*–16*d* and 18*a*–18*d* in the sets 16 and 18**, respectively. It is not essential, however, that there be only four ports per set. On the contrary, and as will be apparent from the description of the second and third embodiments of this invention to be made in conjunction with FIGURES 12–19 and 20–27, respectively, the number of ports in a given set, as well as their location, may be varied within certain limits in accordance with the number and type of flow paths desired by the user.

The plug 12, as best shown in FIGURE 1, includes a main portion 34, a lower threaded portion 36 and an upper handle-engaging- portion or stem 38. The main portion 34 of the plug 12 is tapered for cooperating with the tapered bore 24, permitting a relatively snug fit to be obtained between the plug and the bore as well as facilitating easy valve assembly. Formed in the peripheral surface of the main portion 34 of the plug 12 are the two pairs or sets of slots 20 and 22, each of which are constructed in accordance with three required and one optional design criteria. The upper set of slots 20, as shown more particularly in FIGURE 5, include a short slot **20*a* and a long slot 20*b*. The short slot 20*a*, in accordance with the first required slot design criterion, is positioned and dimensioned relative to the ports 16*a*, 16*b* 16*c* and 16*d* with which it cooperates such that in at least one of its positions it simultaneously communicates with at least two adjacent ports. In the embodiment shown in FIGURES 1–11, the slot 20*a* is dimensioned and positioned such that it at least communicates with ports 16*a* and 16*b*, as shown in FIGURES 5 and 7. The longer slot 20*b*, in accordance with the second required slot design criterion, is positioned and dimensioned relative to the ports 16*a*, 16*b*, 16*c* and 16*d* with which it cooperates such that in at least one of its positions it simultaneously communicates with at least three adjacent ports. In the preferred embodiment of the valve depicted in FIGURES 1–11, the long slot 20*b* communicates in one of its positions with at least three adjacent ports as shown, for example, in FIGURES 9 and 10. In addition, the slots 20*a* and 20*b*, in accordance with the third required slot design criterion, are positioned and dimensioned such that one of the spaces or lands 20***c* and 20*d* between the slots, when the plug 12 is in one of its operative positions, functions to block one of the ports 16*a*–16*d*. While in the preferred embodiment of the valve depicted in FIGURES 1–11 both lands 20*c* and 20*d* between the slots 20*a* and 20*b* are dimensioned so as to be capable of blocking a port, as shown for example in FIGURE 6, it is only necessary in accordance with the third required slot design criterion, that one of the lands have this capability as will be seen in conjunction with the second and third preferred embodiments of the invention depicted in FIGURES 12–19 and 20–27, respectively.

The second set of slots 22 is formed in the peripheral surface of the plug 12 in a position such as to substantially underlie the set of slots 20. More specifically, the slots 22*a* and 22*b* comprising the set of slots 22 are located and dimensioned so as to substantially underlie the slots 20*a* and 20*b* comprising the sets of slots 20. However, it is to be understood that the slots 22*a* and 22*b* need not underlie the slots 20*a* and 20*b*. The only essential requirement respecting the slots 22*a* and 22*b* is that they satisfy the three slot design criteria set forth in the above paragraph. Namely, in accordance with the first required slot design criterion, the shorter of the two slots must be dimensioned and positioned so that in at least one of its orientations it is in communication with at least two adjacent ports 18*a*, 18*b*, 18*c* and 18*d*. The longer slot must be dimensioned and positioned, in accordance with the second required slot design criterion, such that in one of its orientations it is in communication with at least three adjacent ports 18*a*, 18*b*, 18*c* and 18*d*. Finally, at least one of the lands 22*c* or 22*d* between the slots 22*a* and 22*b* must be dimensioned, in accordance with the third required slot design criterion, such that in one of its orientations relative to the valve body it blocks one of the ports 18*a*–18*d*.

A further and optional design criterion for the configuration of the slots, which is essential only if it is desired that the plug 12 have the capability of preventing, in one of its orientations relative to the valve body 10, the interconnection of any of the ports and thereby the existence of any flow pattern, is that the longest slot of a set be dimensioned such that in at least one valve position the slot does not communicate simultaneously with the most widely spaced ports when fully encompassing one of said ports. The first preferred embodiment of the valve depicted in FIGURES 1–11 is designed to have this optional capability, that is, to prevent, in one of its positions, the existence of any flow path. Consequently, as shown more particularly in FIGURE 6, the longer slot 20*b* is dimensioned, in accordance with this optional slot design criterion, such that it cannot communicate simultaneously with the most widely spaced ports 16*a* and 16*d* when one end of the plug slot completely encompasses one of the two most widely spaced ports. Hence, the valve embodiment of FIGURES 1–11 can be positioned such that it prevents any flow paths from existing between ports 16*a*–16*d*. Since the lower ports 18*a*–18*d* and slots 22*a* and 22*b* underlie the upper ports 16*a*–16*d* and slots 20*a* and 20*b*, respectively, the valve position which prevents flow between the ports 16 also prevents flow between the ports 18.

The slots 20 and 22 preferably are shaped such that the passages formed in conjunction with the bore 24 do not have at any point a cross-sectional area less than that of the ports 16 and 18. Shaping in accordance with the preferred practice avoids constrictions in the flow paths.

The handle engaging portion 38 of the plug 12 is integral with the main plug portion 34 and constitutes the valve stem. The stem 38 is substantially square in cross-section for snugly engaging a square hole 39 formed in the actuating handle or lever 14. A hole 41 is provided in stem 38 for receiving a pin 43 which passes through diametrically opposed holes 45 and 47 in the lever 14, and thereby prevents inadvertent removal of the handle.

The lower portion 36 of the plug 12, which is threaded, extends in an axial direction beyond the lower edge 50 of the valve body through a washer 40 for threaded engagement by a nut 42. The nut 42, when threaded on the downwardly extending plug portion 36, draws the plug 12 in a downward direction causing it to seat tightly in the bore 24. Between the main portion 34 and the threaded portion 36 of the plug 12 is an intermediate diameter portion 44, the vertical peripheral surface of which forms a shoulder 46. The shoulder 46 is adapted to seat in a bore 48 of the washer 40 to thereby locate the washer relative to the lower edge 50 of the valve body 10. In operation, with the nut 42 threaded on the lower plug portion 36, the washer 40 and plug 12 rotate as an integral unit under the action of the lever 14, for reasons to be described.

The plug 12 is provided with three axially spaced circumferential grooves 60, 61 and 62 in which are adapted to seat three O-rings 63, 64 and 65. The O-ring 63 provides a seal between the atmosphere and the first or upper set of slots 20 and ports 16. The intermediate O-ring 64 provides a seal between the upper set of slots 20 and ports 16 and the lower set of slots 22 and ports 18. The lower O-ring 65 provides a seal between the atmosphere and the second or lower set of slots 22 and ports 18.

The valve further includes a valve position-indicating disc 70 which as shown in FIGURE 3 is substantially annular in shape. The outer position of the disc 70 seats on the upper edge 71 of the valve body 10 and is secured thereto by suitable fasteners 72 and 73. The disc 70 is adapted to receive suitable designations 99–104 which, in cooperation with a pointer 74 formed integral with the actuating lever or handle 14, indicate the particular flow paths provided by different positions of the valve plug 12 relative to the body 10. For example, assuming that with the handle 14 in the position shown in FIGURE 3 the slots 20*a* and 20*b* are positioned relative to the ports 16 as shown in FIGURE 5, the ports 16*a* and 16*b* are connected via slot 20*a*, and ports 16*c* and 16*d* are connected via slot 20*b*. If the valve is being used in a fuel supply system of the type described previously, the position of the plug and handle shown in FIGURES 3 and 5 may correspond to the interconnection of, for example, the starboard tank feed line port 16*a* with the starboard engine intake line port 16*b*, and the interconnection of the port tank feed line port 16*d* with the port engine intake line port 16*c*. Of course, when the valve is in the position shown in FIGURES 3 and 5, the slot 22*a* will simultaneously connect ports 18*a* and 18*b* and the slot 22*b* will simultaneously connect ports 18*c* and 18*d*. Assuming the valve of FIGURE 5 is being utilized in a marine fuel supply system of the type in which more fuel is pumped than burned, the port 18*b* is connected to the starboard engine fuel exhaust line and the port 18*a* is connected to the starboard tank return line. Likewise, the port 18*c* is connected to the port engine fuel exhaust line and the port 18*d* is connected to the port tank return line. Summarizing, with the valve in the position shown in FIGURE 3 and FIGURE 5, the port and starboard tanks are connected, respectively, to the port and starboard engines for performing both the fuel feeding function and the fuel returning function.

A leaf spring detent 80 connected to the peripheral surface of the washer 40 by a pair of fasteners 82 engages alternatively a plurality of notches 84 formed at spaced positions around the lower peripheral edge of the valve body 10. A notch-engaging portion 85 on the detent 80, which is best shown in FIGURE 1, is urged against the lower peripheral surface of the valve body 10 and is adapted to seat in various ones of the notches 84 as the valve plug 12 rotates carrying with it the washer. The notches 84 are located relative to the detent 80 such that for each valve position 99–104 a notch is positioned opposite the notch engaging portion 85 of the detent 80.

The combination of the detent 80 bearing notch-engaging portion 85 and the notches 84 enables the plug 12 to be releasably restrained in its various operating positions 99–104.

A set 90 of three threaded bosses is formed on the outer portion of the valve body 10 to facilitate the mounting of the valve to a support surface in any conventional manner as may be desired by the user. The set 90 of bosses includes a pair of upper bosses **91*a* and 91*b* and a lower central boss 92**.

The actuating lever or handle 14 may be of any suitable design. The handle 14 is provided with the hold 39 which is adapted to engage the stem 38 of the plug 12 and has a configuration which conforms to that of the stem 38. The pair of diametrically opposed holes 45 and 47 provided in the plug engaging portion of the handle 14 are adapted to receive the lock pin 43 passing through the suitable positioned hole 41 in the plug stem 38 for preventing the handle 14 from being inadvertently removed from the stem.

Figure 6:
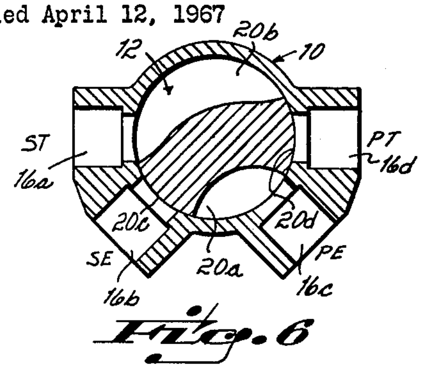
Figure 7:
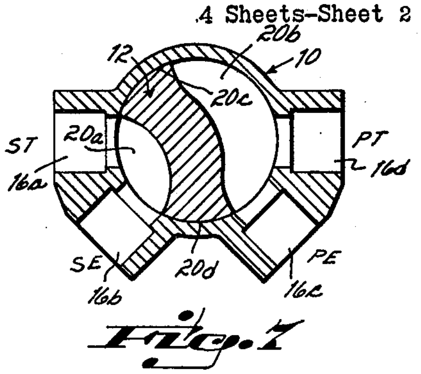

The preferred embodiment of the invention depicted in FIGURES 1–11 has six operative positions. The first of these positions is depicted in FIGURE 6 and constitutes the "off" position in which none of the ports are interconnected. Consequently, no flow paths exist. This no flow feature, it will be remembered, is present due to the inclusion in the valve slot design of the optional slot design criterion set forth earlier. Referring to FIGURE 6, it is noted that land **20*c* between slots 20*a* and 20*b* fully blocks the starboard engine port 16*b* while land 20*d* fully blocks the port tank 16*d*. Slot 20*a* communicates only with the port engine 16*c* and, therefore, is ineffective to establish a flow path between any ports. Slot 20*b* communicates only with starboard tank port 16*a* and is likewise unable to establish a flow path between this port and any of the others. With the plug 12 in the position shown in FIGURE 6 relative to the body 10, the pointer 74 and handle 14 will be opposite the "off" designation 99 on the indicating disc 70**, providing a visual indication to the valve operator that neither of the tanks are communicating with either of the engines.

If the operating lever 14 is rotated clockwise, as viewed in FIGURE 3 from the "off" position 99 through an angle of 90°, the plug 12 will be located relative to the body 10 as shown in FIGURE 7. In this position, the slot **20*a* communicates with the starboard tank port 16*a* and starboard engine port 16*b*, enabling fuel to be pumped from the starboard tank to the starboard engine. In addition, the slot 20*b* communicates with the port engine 16*c* and the port tank port 16*d*, enabling the fuel to be pumped from the port tank to the port engine. Existence of flow paths between the starboard engine and tank and between the port engine and tank is apparent to the valve operator inasmuch as the pointer 74 is opposite the designation 100 on the indicating disc 70. The indication 100** shows that the port and starboard engines, symbolized by encircled letters P and S, respectively, are interconnected with the port and starboard tanks, symbolized by the letters P and S enclosed in squares, respectively, the interconnections being indicated by lines connecting the various tanks and engine symbols.

Figure 8:
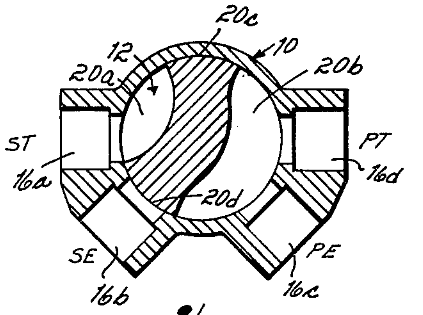

Should the handle 14 now be rotated clockwise as viewed in FIGURE 3 through an angle of 45°, the plug and body orientation depicted in FIGURE 8 exists. As shown in FIGURE 8, the land **20*d* blocks the starboard engine port 16*b*, the slot 20*a* communicates with nothing other than the starboard tank port 16*a*, and the slot 20*b* communicates with both the port tank port 16*d* and the port engine port 16*c*, establishing the only flow path between the tanks and engines. The existence of this flow path between the port tank and the port engine when the valve plug and body occupy the orientation of FIGURE 8 is visually indicated to the valve operator by the presence of the indicator 74 adjacent the designation 101** in which the port engine and the port tank symbols are connected by a line.

Figure 9:
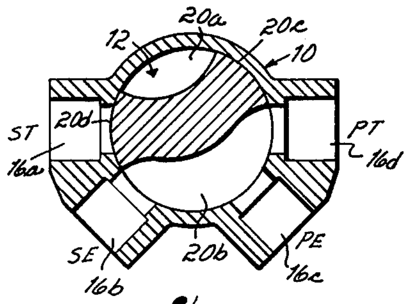

Further rotation of the operating lever 14 in a clockwise direction through an angle of 45° produces the relative orientation of the plug and body depicted in FIGURE 9. In this position, the land **20*d* fully blocks the starboard tank port 16*a* and the slot 20*b* interconnects the port tank 16*d* with both the starboard engine port 16*b* and the port engine port 16*c*. Thus, both the starboard engine and the port engine are being fed fuel from the port tank. The existence of such an interconnection is evidenced by the presence of the pointer 74 at the designation 102** in which the port and starboard engines symbols are connected to the port tank symbol.

Figure 10:
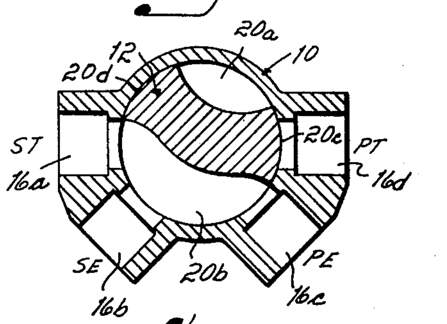

Additional rotation of the lever 14 in a clockwise direction through an angle of 45° results in the relative plug and body orientations depicted in FIGURE 10 in which the starboard tank port **16*a* is connected to both the starboard engine port 16*b* and the port engine port 16*c* and the port tank port 16*d* is blocked by the plug land 20*c*. The existence of this particular flow pattern is visually indicated to the valve operator by the presence of the pointer 74 adjacent the designation 103** in which the port and starboard engine symbols are connected to the starboard tank symbol.

Figure 11:
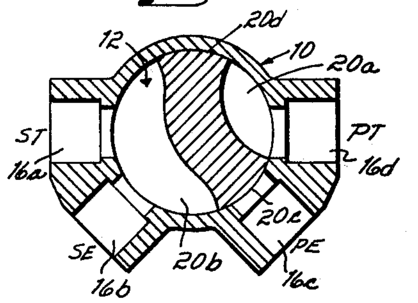

Finally, if the operating lever 14 is rotated in a clockwise direction through an additional 45°, the port and plug orientation depicted in FIGURE 11 is obtained. In this orientation, the starboard tank port **16*a* and the starboard engine port 16*b* are interconnected via slot 20*b*, while the port engine port 16*c* is blocked by the land 20*c* and the port tank port 16*d* communicates only with the slot 20*a*. Evidence of the interconnection of the starboard tank and starboard engine is provided by the pointer 74 which is adjacent the designation 104** in which the starboard engine and tank symbols are connected.

While FIGURES 6–11 show the flow paths existing between the starboard and port engine intake lines and the starboard and port fuel feed lines, it is to be remembered that corresponding paths exist in the various valve positions as a consequence of coaction of the lower set of slots 22 with the lower set of ports 18. For example, when the plug 12 and body 10 occupy the relative position shown in FIGURE 6 wherein the starboard and port engine intake lines are not connected with either the starboard or port tank feed lines, the slots 22 and ports 18 are positioned such that the starboard engine and port engine fuel exhaust lines are not connected to the starboard and port tank fuel return lines. Likewise, when the plug 12 and body 10 occupy the relative position shown in FIGURE 7 wherein the starboard and port tank feed lines are connected to the starboard and port engine intake lines, respectively, the slots 22 and ports 18 are interconnected such that the starboard and port fuel exhaust lines are connected to starboard and port tank return lines, respectively. In a similar manner, rotatably positioning the plug 12 relative to the body 10 to any of the orientations shown in FIGURES 8–11 causes the slots 22 and ports 18 to be interconnected in a manner corresponding to and coordinated with the interconnections of the slots 20 and ports 16.

It is to be clearly understood at this point that the valve of this invention need not necessarily include plural sets of ports and slots. For example, if in a marine fuel supply system, the fuel pump supplies the engine with precisely the amount of fuel being burned in contrast to pumping fuel at a rate several times that at which it is burned, the fuel return lines are not necessary. Consequently, only the upper set of ports **16*a* which are connected to the tank feed lines and the engine intake lines need be provided. Likewise, only the slots 20*a* and 20*b* which cooperate with the ports 16*a*–16*d* need be provided. The ports 18*a*–18*d* and slots 20*a* and 20*b*** are not necessary as long as return lines do not exist.

A second preferred embodiment of the invention is depicted in FIGURES 12–19. In this embodiment, at least four ports 111–114 are provided in the valve body 10′, thereby satisfying the required design criterion governing the ports set forth earlier. The ports 111–114 are equally spaced about the circumference of the plug body 10 at 45° intervals. The configuration of slots 120*a* and 120*b* provided in the plug 12′ satisfy both the required and optional slot design criteria set forth earlier with respect to the embodiment of FIGURES 1–11. Specifically, the shorter slot 120*a* is adapted in at least one of its positions to connect with at least two adjacent ports, in accordance with the first required slot design criterion. In addition, the slot 120*b* in at least one of its positions is adapted to communicate with at least three adjacent ports as shown more particularly in FIGURE 13, in accordance with the second required slot design criterion. In fact, the slot 120*b* can connect all four of the adjacent ports. The third required slot design criterion is also satisfied, namely, one of the lands 120*c* between the slots 120*a* and 120*b*, in one of its positions, blocks off at least one port. Compliance with the preceding required port and slot design criteria provides a quick acting and compact valve having a plurality of different flow patterns.

While the optional slot design criterion, which prevents the existence of any flow paths, need not necessarily be included in the second preferred embodiment, the valve of FIGURES 12–19 does include such an optional no flow-pattern feature. Specifically, the preferred embodiment of the valve depicted in FIGURES 12–19 has its longer slot 120*b* positioned and dimensioned such that in one position when the slot fully communicates with one of the most widely spaced ports 111, the slot 120*b* does not also simultaneously communicate with the other most widely spaced port 114. If, as is the case in the preferred embodiment of FIGURES 12–19, this optional slot design feature is included, the valve in one of its positions prevents the existence of any flow pattern between the ports. It is emphasized that if this optional slot design feature is not included, a valve is provided having the capacity to provide a plurality of flow patterns. Such a valve, however, does not have a position in which no flow patterns exist. Thus, the provision of the optional slot design feature provides the additional capability, in one position, of preventing the existence of any flow patterns.

Figure 12:
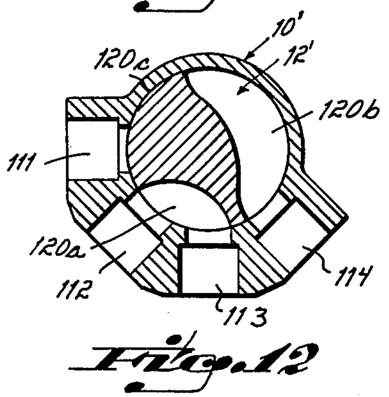
Figure 13:
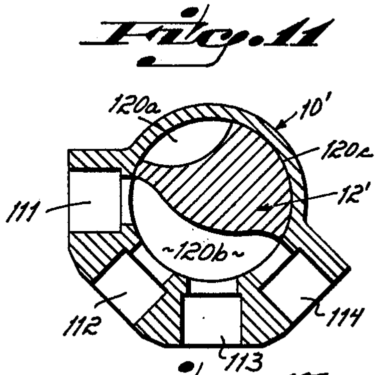
Figure 14:
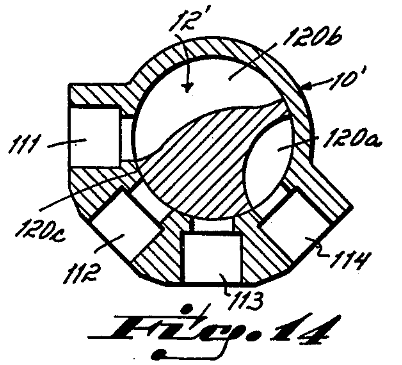
Figure 15:
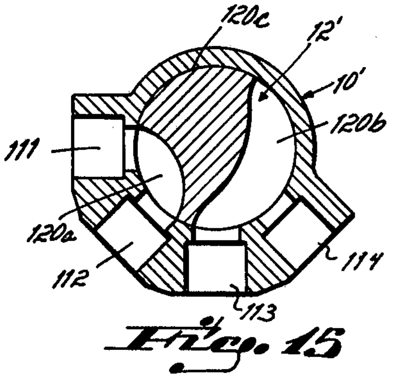
Figure 16:
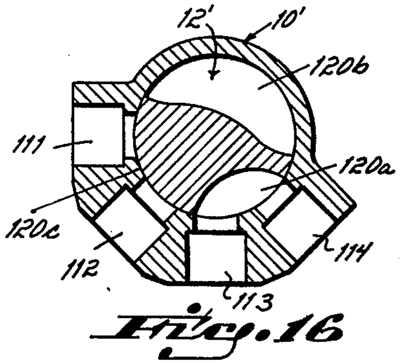
Figure 17:
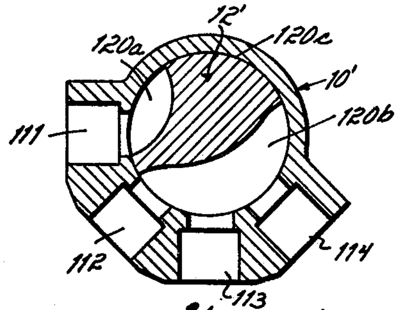
Figure 18:
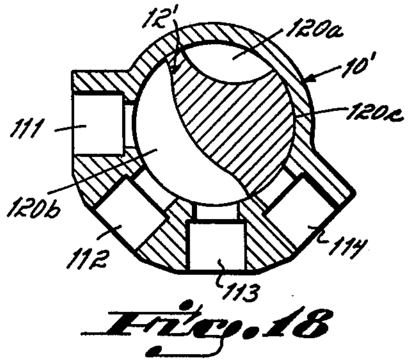
Figure 19:
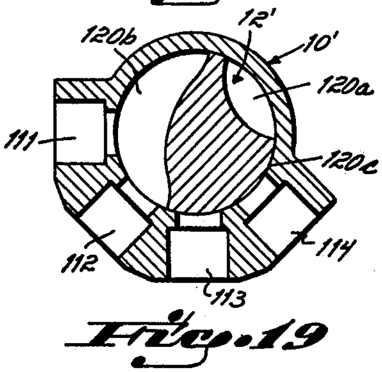

The valve of FIGURES 12–19 has eight operative positions. In the position of FIGURE 12, ports 112 and 113 are interconnected via slot 120*a* while port 111 is blocked by land 120*c* and port 114 communicates only with slot 120*b*. In the position shown in FIGURE 13, all four ports are interconnected via slot 120*b*. In the valve position shown in FIGURE 14, no flow patterns exist. Ports 112 and 113 are blocked by the land 120*c* while ports 111 and 114 communicate respectively with slots 120*b* and 120*a*, producing no flow. The valve position of FIGURE 14 clearly depicts the function of the optional slot design criterion discussed earlier, namely, by dimensioning the slot 120*b* such that when it is in one of its possible positions, it fully connects with one of the most widely spaced ports 111 and does not communicate with the other most widely spaced port 114. In the valve position shown in FIGURE 15, ports 111 and 112 are interconnected by the shorter slot 120*a* and ports 113 and 114 are interconnected by the longer slot 120*b*. With the orientations of the valve body and plug depicted in FIGURE 16, one flow path exists, namely, a flow path between ports 113 and 114 via slot 120*a*. In FIGURE 17, the ports 112, 113 and 114 are interconnected via the longer slot 120*b* while the port 111 communicates with only the shorter slot 120*a*. In FIGURE 18, the three ports 111–113 are interconnected by the longer slot 120*b* while the port 114 is blocked by the land 120*c*. Finally, in FIGURE 19, the ports 111 and 112 are interconnected via the slot 120*b*, while the ports 113 and 114 are blocked by the land 120*c*.

It is noted that the valve of FIGURES 12–19 has eight flow patterns in contrast to the six flow patterns which are capable of existing with the valve depicted in FIGURES 6–11. It is further noted that in each of the valves of FIGURES 6–11 and FIGURES 12–19, only four ports cooperate with any given set of slots in the plug. Yet, in the valve of FIGURES 12–19, two additional flow paths are provided. These additional flow paths are produced merely by re-positioning the ports and slots. Specifically, the required four ports in the valve of FIGURES 6–11, which are divided into two pairs spaced a distance equal to one port, are, in the valve of FIGURES 12–19, not spaced, providing four adjacent ports. In addition, the configuration and dimensions of slots 120*a* and 120*b* have been modified, as required by the re-positioning of the ports 111–114, to satisfy the three required and the one optional design criteria discussed previously. Namely, the slots 120*a* and 120*b* have been positioned and dimensioned such that the shortest slot 120 communicates with at least two adjacent ports, the longest slot 120*b* communicates with at least three adjacent ports, one of the lands 120*c* blocks at least one of the ports, and as an optional feature for preventing flow in one position, the longest slot when fully communicating with one of the most widely spaced ports is not in communication simultaneously with the other of the most widely spaced ports.

A third embodiment of the invention having eight operative positions is depicted in FIGURES 20–27. In this embodiment, five ports 131–135 are provided at equally spaced 45° intervals around the periphery of the valve body 136, thereby satisfying the port design criterion requiring at least four ports. In this embodiment, like the preceding two embodiments, the slots 140*a* and 140*b* of the plug 142 are positioned and dimensioned in accordance with the three necessary slot design criteria for providing a multiplicity of flow patterns and in accordance with the fourth and optional slot design criterion for preventing any flow paths in one of the valve positions. In accordance with the three required slot design criteria, the shortest slot 140*a* is positioned and dimensioned, as shown, for example, in FIGURE 21, to communicate with at least two adjacent ports; the longest slot 140*b* is positioned and dimensioned, as shown, for example, in FIGURE 23, to communicate with at least three adjacent ports; and the land 140*c* is dimensioned to block at least one of the ports, as shown, for example, in FIGURE 22. In addition, the fourth and optional slot design criterion for preventing all flow is satisfied. Specifically, with the valve in one of its positions, the longest slot 140*b* when fully communicating with one of the most widely spaced ports 135, as shown, for example, in FIGURE 26, does not simultaneously communicate with the other of the most widely spaced ports.

Figure 20:
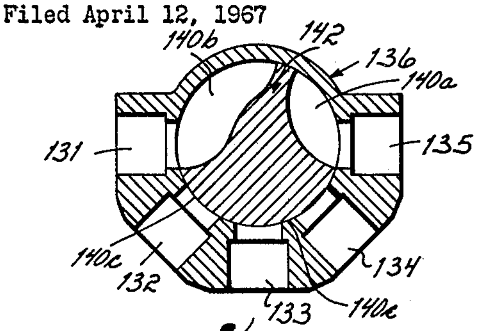
Figure 21:
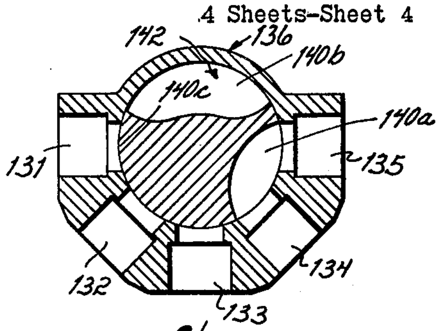
Figure 22:
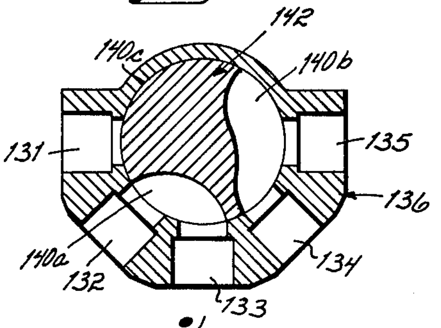
Figure 23:
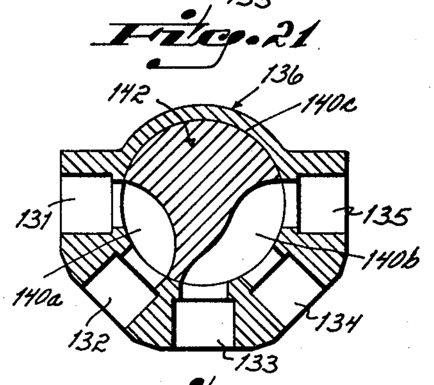
Figure 24:
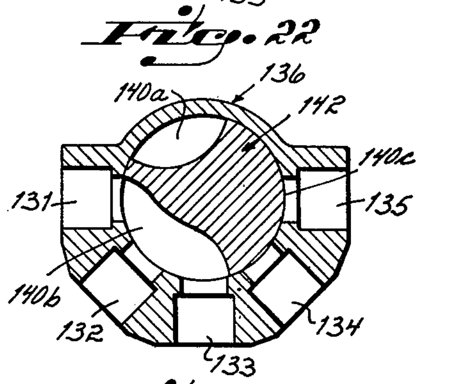
Figure 25:
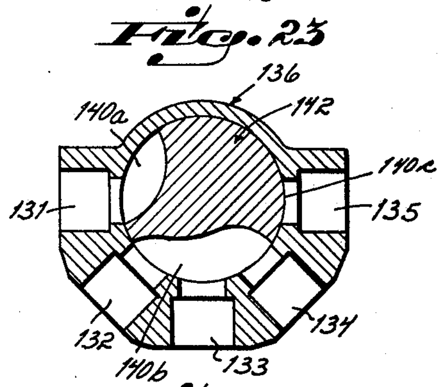
Figure 26:
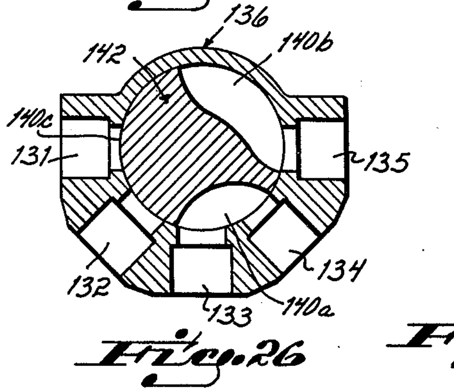
Figure 27:
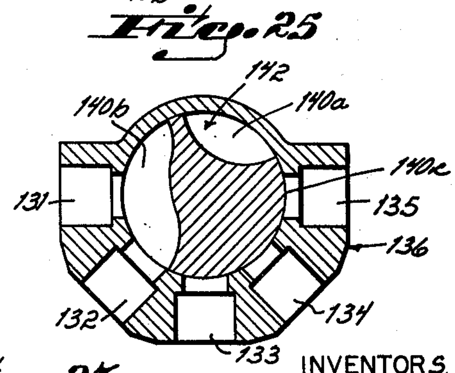

In FIGURE 20, no flow paths exist. Port 131 communicates only with slot 140*b*, port 135 communicates only with slot 140*a* and ports 132, 133, and 134 are blocked by the land 140*c*, preventing the existence of any flow paths. In FIGURE 21, ports 134 and 135 are interconnected by the shorter slot 140*a*, while the remaining slots 131, 132, and 133 are blocked by the land 140*c*. In FIGURE 22, two different flow paths exist, namely, ports 134 and 135 are interconnected by the longer slot 140*b* and ports 132 and 133 are connected via the shorter slot 140*a*. The fifth port 131 is blocked by the land 140*c*. The valve as oriented in FIGURE 23 also has two different flow paths. Specifically, ports 131 and 132 are interconnected via the shorter slot 140*a* while the ports 133, 134 and 135 are interconnected by the longer slot 140*b*. In FIGURE 24, the three ports 131, 132 and 133 are interconnected by the longer slot 140*b* while the ports 134 and 135 are blocked by the land 140*c*. In FIGURE 25, the ports 132, 133 and 134 are interconnected by the longer slot 140*b* while the port 135 is blocked by the land 140*c* and the port 131 connects only with the slot 140*a*, preventing flow to or from ports 131 and 135. In FIGURE 26, ports 133 and 134 are interconnected by the shorter slot 140*a* while the ports 131 and 132 are blocked by the land 140*c* and the port 135 communicates only with the slot 140*b*, preventing any flow to or from the ports 131, 132 and 135. Finally, in FIGURE 27, ports 131 and 132 are interconnected via the slot 140*b* while the three remaining ports 133, 134, and 135 are blocked by the land 140*c*. Thus, a third embodiment of the valve constructed in accordance with the principles of this invention has been provided in which, by adding a fifth port, which is in addition to the required four ports, and positioning and dimensioning the slots 140*a* and 140*b* in accordance with the required and optional slot design criteria enumerated previously, enables a multiplicity of flow patterns to be produced which, because of the inclusion of optional slot design feature, includes a zero flow pattern.

What is claimed is:

1. A multiple flow pattern valve comprising:

a valve body having a bore and at least four ports separated by spaces, said ports communicating with said bore; and a plug rotatably mounted in said bore, said plug having first and second different lengths peripheral slots separated by spaces, the first slot being dimensioned and positioned to simultaneously communicate with at least two adjacent ports, said second slot being dimensioned to communicate simultaneously with at least three adjacent ports, and one of the spaces between said slots being dimensioned to fully block for completely sealing off at least one of said ports; and a valve actuator for producing relative rotational movement between said plug and said body for selectively interconnecting different ones of said ports with said slots, to thereby vary the flow pattern among said ports.

2. The valve of claim 1 wherein the other of the spaces between said slots is also dimensioned to fully block for completely sealing off one of said ports.

3. A multiple flow pattern valve comprising:

a valve body having a bore and at least four ports separated by spaces, said ports communicating with said bore; and a plug rotatably mounted in said bore, said plug having first and second different length peripheral slots separated by spaces, the first slot being dimensioned and positioned to simultaneously communicate with at least two adjacent ports, said second slot being dimensioned and positioned to communicate simultaneously with at least three adjacent ports, and one of the spaces between said slots being dimensioned to block at least one of said ports, the other of the spaces between said slots being dimensioned such that it cannot block one of said ports; and a valve actuator for producing relative rotational movement between said plug and said body for selectively interconnecting different ones of said ports with said slots, to thereby vary the flow pattern among said ports.

4. The valve of claim 3 wherein the space between two specified adjacent ports of said valve body is wider than at least one other space between any other two adjacent ports, and wherein said second slot is dimensioned and positioned to be uncommunicative simultaneously with said two specified adjacent ports when said second slot fully encompasses one of said two specified adjacent ports for enabling said plug and body to be relatively positioned to prevent said two specified adjacent ports from being interconnected.

5. A multiple flow pattern valve comprising:

a valve body having a bore and at least four ports separated by spaces, said ports communicates with said bore; and a plug rotatably mounted in said bore, said plug having first and second different length peripheral slots separated by spaces, the first slot being dimensioned and positioned to simultaneously communicate with at least two adjacent ports, said second slot being dimensioned and positioned to communicate simultaneously with at least three adjacent ports, and one of the spaces between said slots being dimensioned to block at least two adjacent ports and the other space between said slots is dimensioned such that it cannot block one of said ports; and a valve actuator for producing relative rotational movement between said plug and said body for selectively interconnecting different ones of said ports with said slots, to thereby vary the flow pattern among said ports.

6. The valve of claim 5 wherein the space between two specified adjacent ports of said valve body is wider than at least one other space between any other two adjacent ports, and wherein said second slot is dimensioned and positioned to be uncommunicative simultaneously with said two specified adjacent ports when said second slot fully encompasses one of said two specified adjacent ports for enabling said plug and body to be relatively positioned to prevent said two specified adjacent ports from being interconnected.

7. A multiple flow pattern valve comprising:

a valve body having a bore and at least four ports separated by spaces, said ports communicating with said bore, and the space between two specified adjacent ports of said valve body being wider than at least one other space between any other two adjacent ports; and a plug rotatably mounted in said bore, said plug having first and second different length peripheral slots separated by spaces, the first slot being dimensioned and positioned to simultaneously communicate with at least two adjacent ports, said second slot being dimensioned and positioned to communicate simultaneously with at least three adjacent ports, said second slot is dimensioned and positioned to be uncommunicative simultaneously with said two specified adjacent ports when said second slot fully encompasses one of said two specified adjacent ports for enabling said plug and body to be relatively positioned to prevent said two specified adjacent ports from being interconnected, and one of the spaces between said slots being dimensioned to block at least one of said ports; and a valve actuator for producing relative rotational movement between said plug and said body for selectively interconnecting different ones of said ports with said slots, to thereby vary the flow pattern among said ports.

8. The valve of claim 7 wherein the other of the spaces between said slots is also dimensioned to block one of said ports.

References Cited

UNITED STATES PATENTS

| | | | |
|---|---|---|---|
| 261,119 | 7/1882 | Adams | 137—625.47 X |
| 1,188,085 | 6/1916 | Krupp | 137—625.19 |
| 3,160,387 | 12/1964 | Windsor | 251—309 X |

M. CARY NELSON, Primary Examiner

WILLIAM R. CLINE, Assistant Examiner

U.S. Cl. X.R.

137—625.47